United States Patent
Hasegawa et al.

(10) Patent No.: US 10,237,337 B2
(45) Date of Patent: Mar. 19, 2019

(54) CONTENT DISTRIBUTION SYSTEM

(71) Applicant: TOSHIBA TEC KABUSHIKI KAISHA, Tokyo (JP)

(72) Inventors: Keiichi Hasegawa, Tokyo (JP); Naoki Nishiyama, Tokyo (JP); Yasuhiro Arai, Shizuoka (JP); Tohru Okada, Tokyo (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/656,783

(22) Filed: Jul. 21, 2017

(65) Prior Publication Data
US 2018/0034898 A1 Feb. 1, 2018

(30) Foreign Application Priority Data
Aug. 1, 2016 (JP) ................. 2016-151506

(51) Int. Cl.
| | |
|---|---|
| H04L 29/08 | (2006.01) |
| G06Q 20/04 | (2012.01) |
| G06F 3/12 | (2006.01) |
| G06Q 30/02 | (2012.01) |
| G07F 17/40 | (2006.01) |
| G06Q 20/20 | (2012.01) |

(52) U.S. Cl.
CPC ............ *H04L 67/10* (2013.01); *G06F 3/1205* (2013.01); *G06F 3/126* (2013.01); *G06F 3/1243* (2013.01); *G06F 3/1288* (2013.01); *G06Q 20/0453* (2013.01); *G06Q 20/209* (2013.01); *G06Q 30/02* (2013.01); *G06Q 30/0268* (2013.01); *G07F 17/40* (2013.01); *H04L 67/20* (2013.01); *H04L 67/26* (2013.01)

(58) Field of Classification Search
CPC combination set(s) only.
See application file for complete search history.

(56) References Cited

U.S. PATENT DOCUMENTS

| | | | |
|---|---|---|---|
| 7,188,154 B2 * | 3/2007 | Minowa ............. | G06Q 30/0238 705/14.38 |
| 7,240,843 B2 * | 7/2007 | Paul ..................... | G06Q 20/341 235/383 |
| 2003/0036979 A1 | 2/2003 | Tokorotani | |
| 2013/0173362 A1 * | 7/2013 | Zhou ..................... | G06Q 30/02 705/14.4 |
| 2015/0254734 A1 * | 9/2015 | Scotto ................ | G06Q 30/0277 705/14.73 |

* cited by examiner

*Primary Examiner* — Helen Zong
(74) *Attorney, Agent, or Firm* — Kim & Stewart LLP

(57) ABSTRACT

A networked computer system distributes content that is to be added to receipts by receipt issuing devices. The system includes a central server, first and second store servers communicating with the central server over a first network, first receipt issuing devices communicating with the first store server over a first local network, and second receipt issuing devices communicating with the second store server over a second local network. A first control plane is implemented in the central server to control whether or not the content is to be distributed to the first store server and whether or not the content is to be distributed to the second store server. A second control plane is implemented in the first and second store servers to control whether or not the content is to be distributed to the first and second receipt issuing devices, respectively.

6 Claims, 12 Drawing Sheets

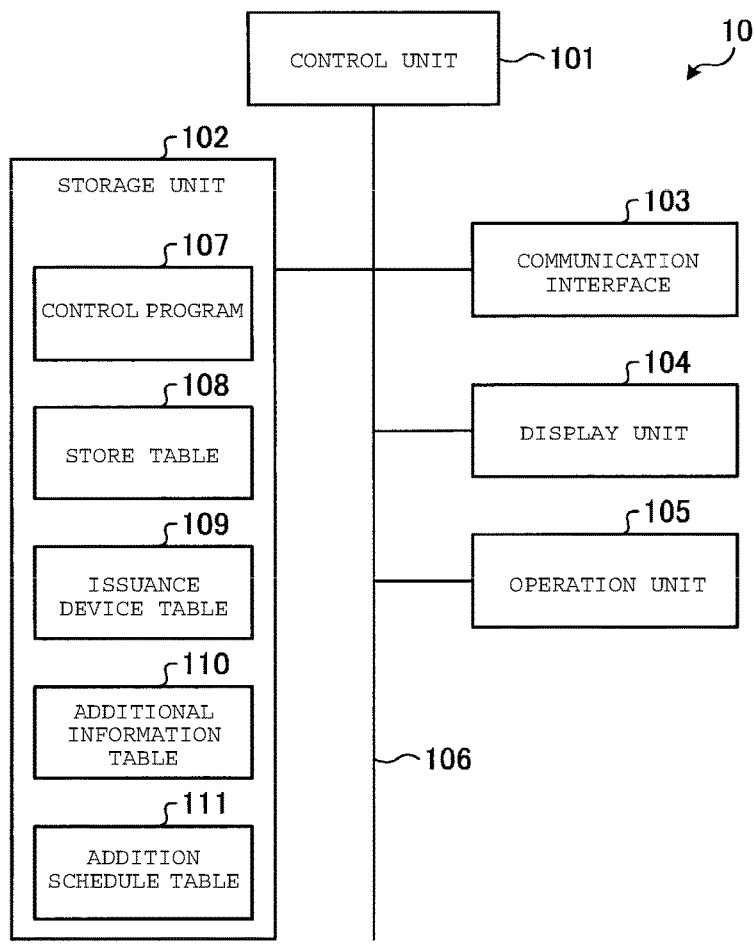

| ISSUANCE DEVICE CODE | DEVICE TYPE | MANUFACTURER CODE | DEVICE MODEL CODE | VERSION | PRINT SPECIFICATION | | |
|---|---|---|---|---|---|---|---|
| | | | | | SIZE | RESOLUTION | ... |
| 0001-AAAA | POS TERMINAL | FFF-GGG-0001 | ABC-1234 | 1.00.123.456 | LONGITUDINAL: 40 mm TRANSVERSE: 50 mm | 1200dpi | ... |
| ... | ... | ... | ... | ... | ... | ... | ... |

| ADDITIONAL INFORMATION CODE | ON-SPECIFICATION-BASIS CODE | ADDITIONAL INFORMATION | PRINT SPECIFICATION | | |
|---|---|---|---|---|---|
| | | | SIZE | RESOLUTION | ... |
| A-01-0001 | 0001 | ADDITIONAL INFORMATION A-1 | LONGITUDINAL: 40 mm TRANSVERSE: 50 mm | 1200dpi | ... |
| | 0002 | ADDITIONAL INFORMATION A-2 | LONGITUDINAL: 50 mm TRANSVERSE: 50 mm | 1200dpi | ... |
| ... | ... | ... | ... | ... | ... |

FIG. 6

| ADDITION SCHEDULE INFORMATION 111 | | | | | |
|---|---|---|---|---|---|
| DATE | TIME PERIOD | DEVICE TYPE | ADDITION CONDITION | ADDITIONAL INFORMATION CODE | REFUSAL STORE CODE |
| 2016/7/2 | 10:00~12:00 | POS TERMINAL | MALE | A-01-0001 | 0015 |
| | | | FEMALE | A-01-0002 | 0620 |
| | | MEASUREMENT DEVICE | MALE | B-02-0001 | 0015 |
| | | | FEMALE | B-02-0002 | 0620 |
| | 10:00~12:00 | POS TERMINAL | CHILD | A-03-0001 | 0059 |
| | | | ADULT MALE | A-03-0002 | 1840 |
| | | | ADULT FEMALE | A-03-0003 | 0256 |
| | | NO DESIGNATION | CHILD | B-04-0001 | 0059 |
| | | | ADULT MALE | B-04-0002 | 1840 |
| | | | ADULT FEMALE | B-04-0003 | 0256 |
| ... | ... | ... | ... | ... | ... |

| ISSUANCE DEVICE CODE | TIME PERIOD | ADDITION CONDITION | ADDITIONAL INFORMATION |
|---|---|---|---|
| 0001-AAAA | 10:00~12:00 | MALE | ADDITIONAL INFORMATION B |
| | | FEMALE | ADDITIONAL INFORMATION C |
| | 10:00~12:00 | CHILD | ADDITIONAL INFORMATION D |
| | | ADULT MALE | ADDITIONAL INFORMATION E |
| | | ADULT FEMALE | ADDITIONAL INFORMATION F |
| ⋮ | ⋮ | ⋮ | ⋮ |

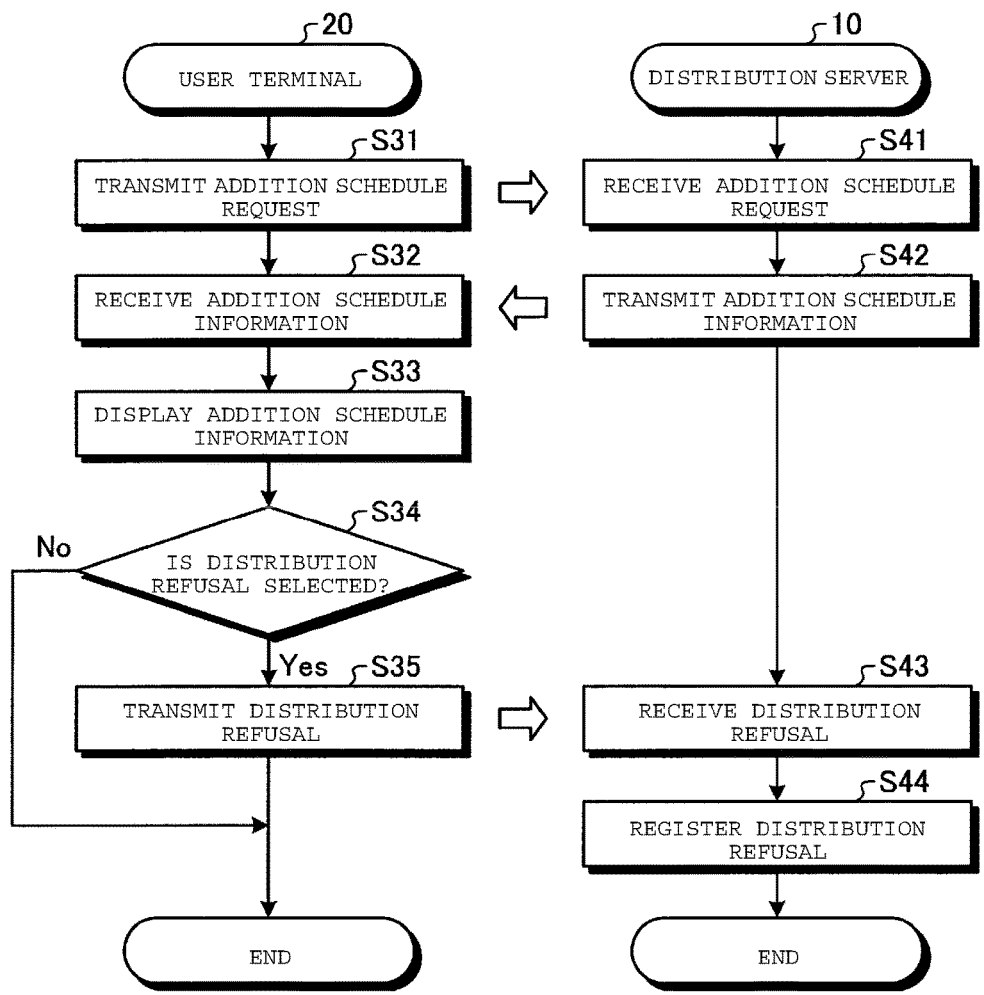

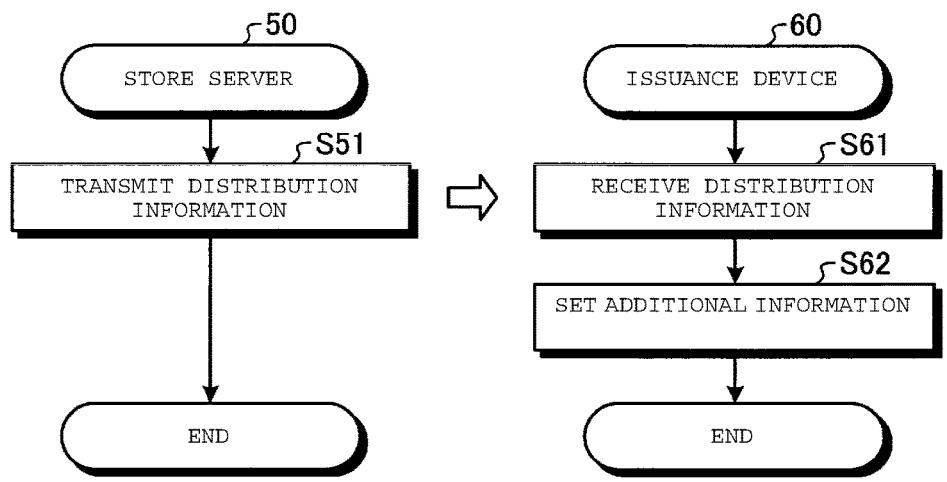
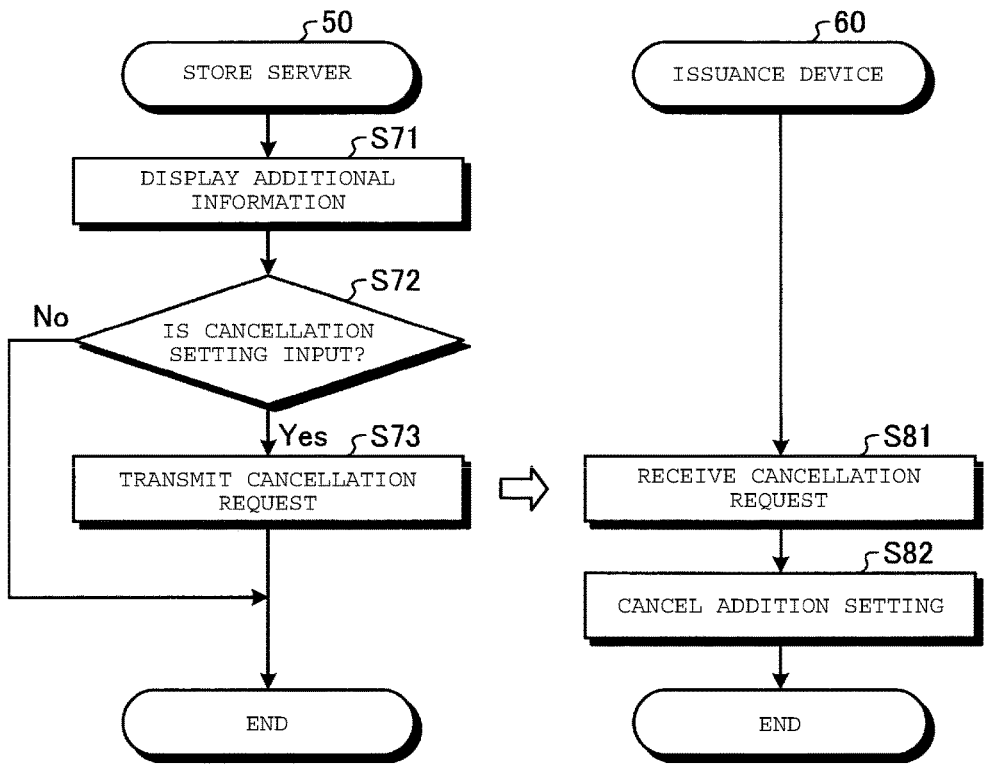

CONTENT DISTRIBUTION SYSTEM

CROSS-REFERENCE TO RELATED APPLICATION

This application is based upon and claims the benefit of priority from Japanese Patent Application No. 2016-151506, filed Aug. 1, 2016, the entire contents of which are incorporated herein by reference.

FIELD

Embodiments described herein relate generally to a content distribution system.

BACKGROUND

In the related art, when retail stores such as supermarkets sell items of merchandise to customers, the retail stores issue receipts on which details related to transactions thereof are printed. In the related art, the receipts are also used as output media of advertising content, and so technologies for distributing advertising content to devices that issue the receipts have been developed.

Incidentally, in order to carry out such advertisement technique on a large scale, it is necessary for a large number of different stores operated by a plurality of different companies to implement technology to add the advertisement to receipts to be issued. To achieve this, it is necessary to manage the distribution of the advertisement using a central server that communicates with a plurality of store servers connected to the receipt issuing devices. In such systems, the distribution of content is controlled through an input interface made available by the central server. With this input interface, the user can define the condition for distributing the advertising content to the store servers so that the advertising content is distributed to only those store servers that meet the condition.

DESCRIPTION OF THE DRAWINGS

FIG. 2 is a block diagram showing an example of a hardware configuration of a distribution server.
FIG. 3 is a diagram showing an example of a data structure of a store table.
FIG. 4 is a diagram showing an example of a data structure of an issuance device table.
FIG. 5 is a diagram showing an example of a data structure of an additional information table.
FIG. 6 is a diagram showing an example of a data structure of an addition schedule table.
FIG. 14 is a flowchart showing an example sequence of operations of a refusal registration process.
FIG. 15 is a flowchart showing an example sequence of operations of a setting process.
FIG. 16 is a flowchart showing an example sequence of operations of a cancellation process.

DETAILED DESCRIPTION

Figure 1:
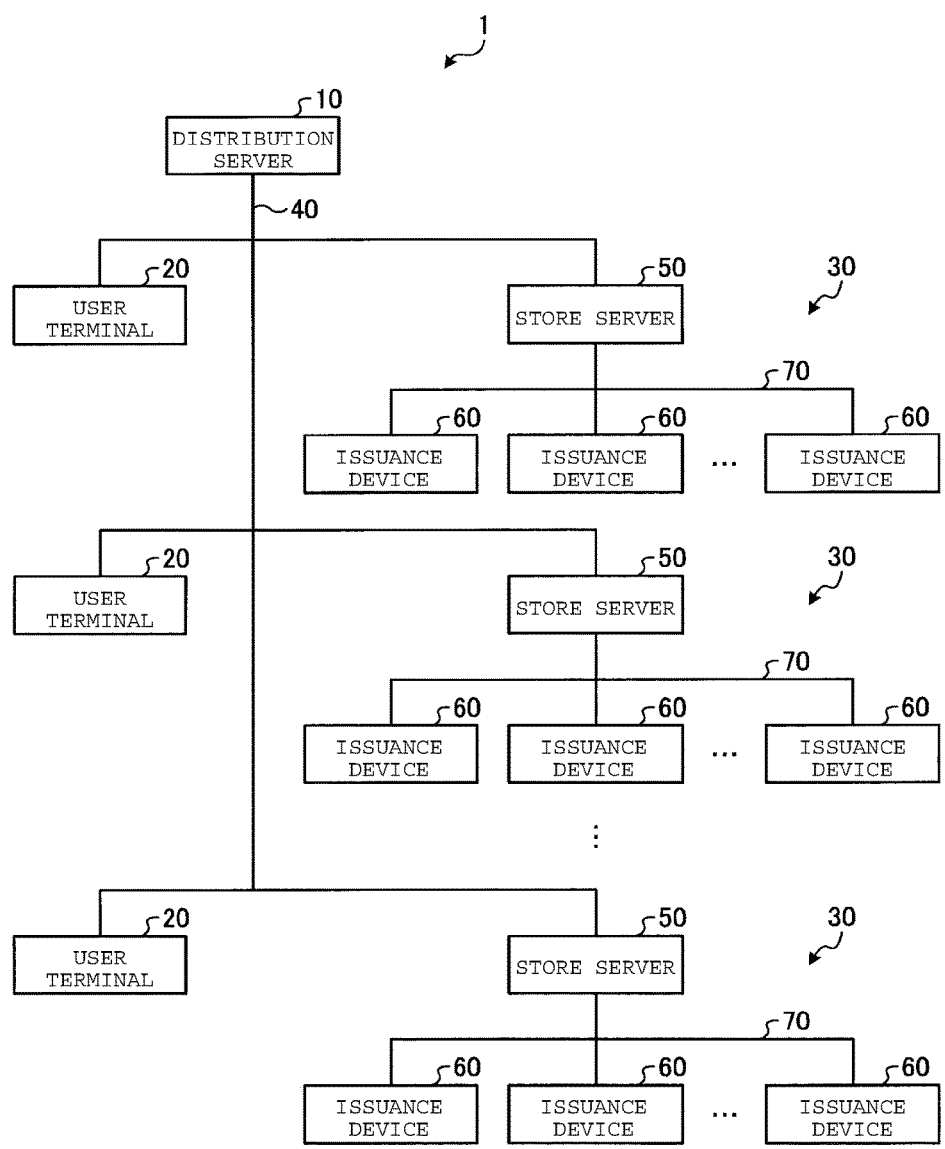
FIG. 1 is a diagram showing an example distribution system according to an embodiment.

Embodiments provide a novel control plane in a networked computer system for distributing content that is to be added to receipts by receipt issuing devices. The large-scale computer system includes a root node (e.g., central server), a plurality of intermediate nodes (e.g., store servers), and a plurality of leaf nodes (e.g., receipt issuing devices). In addition to implementing a control plane at the root node, embodiments implemented an additional, novel control plane at the intermediate nodes.

In general, according to one embodiment, a networked computer system distributes content that is to be added to receipts by receipt issuing devices. The system includes a central server at a root node of the networked computer system, a plurality of store servers that are intermediate nodes of the networked computer system, the store servers including a first store server communicating with the central server over a first network and a second store server communicating with the central server over the first network, a plurality of first receipt issuing devices that are leaf nodes of the networked computer system, the first receipt issuing devices communicating with the first store server over a first local network, and a plurality of second receipt issuing devices that are also leaf nodes of the networked computer system, the second receipt issuing devices communicating with the second store server over a second local network. A first control plane is implemented at the root node to control whether or not the content is to be distributed to the first store server and whether or not the content is to be distributed to the second store server, and a second control plane is implemented at each of the intermediate nodes, the second control plane implemented at the first store server controlling whether or not the content is to be distributed to the first receipt issuing devices and the second control plane implemented at the second store server controlling whether or not the content is to be distributed to the second receipt issuing devices.

In general, according to another embodiment, a content distribution server is at a root node of a networked computer system that has store servers that are intermediate nodes of the networked computer system, the store servers including a first store server communicating with the content distribution server over a first network and a second store server communicating with the content distribution server over the first network, a plurality of first receipt issuing devices that are leaf nodes of the networked computer system, the first receipt issuing devices communicating with the first store server over a first local network, and a plurality of second receipt issuing devices that are also leaf nodes of the networked computer system, the second receipt issuing devices communicating with the second store server over a second local network. The content distribution server includes a control unit including a processor, and a storage unit in which control programs executed in the processor are stored. The control programs include executable code for a management unit that manages data structures that associate store codes capable of identifying stores corresponding to the store servers, device codes capable of identifying the first and second receipt issuing devices, and print specifications of the first and second receipt issuing devices, a distribution unit that generates content that is to be added to receipts issued by the first and second receipt issuing devices, and a reception unit that process control inputs relating to whether or not the content is to be distributed to the first store server and whether or not the content is to be distributed to the second store server. The first receipt issuing devices includes a first device with a first print specification and a second device with a second print specification, and the second receipt issuing devices includes a third device with the first print specification and a fourth device with the second print specification, and the distribution unit selects as a distribution target for a first content, the first and third devices and not the second and fourth devices, and to select as a distribution target for a second content, the second and fourth devices and not the first and third devices.

Hereinafter, a large-scale content distribution system according to embodiments will be described in detail with reference to the drawings. The embodiments of the large-scale content distribution system described below are not limiting, and it should be understood that there are other embodiments of the large-scale content distribution system.

FIG. 1 is a diagram showing an example distribution system 1 according to the embodiment. The distribution system 1 includes a distribution server 10, user terminals 20, and store systems 30. The distribution server 10, the user terminal 20, and the store system 30 are connected via a distribution network 40 such as the Internet or a virtual private network (VPN).

The distribution server 10 is a server device. The distribution server 10 distributes additional information, such as an advertisement to be added to a receipt, to each of the store systems 30 (store servers 50 to be described below). The distribution server 10 is not limited to one server device, and may be a plurality of server devices in a group. When the distribution server 10 is a server device group, functions of the distribution server 10 may be distributed among the server devices. When the distribution server 10 is the server device group, various information items stored in the distribution server 10 may be distributed among and may be stored in the server devices.

The user terminal 20 is an information processing device such as a computer or a smart phone used by an administrator of the store system 30. For example, before the additional information is distributed, using the user terminal 20, the administrator of the store system 30 may transmit a refusal of the distribution of the additional information to the distribution server 10.

The store system 30 is a system established in a store of a retail store such as a supermarket. Each store system 30 includes a store server 50 and issuance devices 60. The issuance device 60 and the store servers 50 are connected via a store network 70 such as a VPN.

The store server 50 is an information processing device such as a computer that manages the issuance devices 60 belonging to the store system 30. That is, after the additional information is distributed, the store server 50 transmits a cancellation of the addition of the additional information to the receipt, to the issuance device 60 that receives the additional information added to the receipt on which the transaction content related to the transaction is represented.

The issuance device 60 is a device that issues printed matter (e.g., receipt) on which a transaction content related to one transaction is printed. For example, the issuance device 60 is a point of sales (POS) terminal, a kiosk terminal that provides various information items to a customer in the store, a receipt printer that prints a receipt, a self-service POS terminal that allows the customer in person to read merchandise, or a measurement device that issues a receipt with a measurement of a weight of the merchandise and a price in accordance with a measurement value.

The issuance device 60 also registers a service or merchandise as a sales target related to one transaction. The issuance device 60 issues a receipt on which transaction content related to one transaction such as a total price of the registered merchandise or service is printed. In the embodiments, the issuance device 60 issues a receipt to which the additional information is added based on a condition for adding the additional information to the receipt.

Hereinafter, hardware configurations of various devices included in the distribution system 1 will be described.

FIG. 2 is a block diagram showing an example of a hardware configuration of the distribution server 10. The distribution server 10 includes a control unit 101, a storage unit 102, a communication interface 103, a display unit 104, and an operation unit 105. The control unit 101, the storage unit 102, the communication interface 103, the display unit 104, and the operation unit 105 are connected to each other through a system bus 106.

The control unit 101 controls the entire operation of the distribution server 10, and carries out various functions of the distribution server 10. The control unit 101 includes a central processing unit (CPU), a read only memory (ROM), and a random access memory (RAM). The CPU generally controls the operation of the distribution server 10. The ROM is a storage medium that stores various programs or data items. The RAM is a storage medium that temporarily stores various programs and various data items. The CPU executes the program stored in the ROM or the storage unit 102 while using the RAM as a work area.

The storage unit 102 is a storage device such as a hard disk drive (HDD) or a solid state drive (SSD). The storage unit 102 stores a control program 107, a store table 108, an issuance device table 109, an additional information table 110, and an addition schedule table 111. The store table 108, the issuance device table 109, the additional information table 110, and the addition schedule table 111 are not limited to be stored in the distribution server 10, and may be stored in another server device.

The control program 107 includes a program executed by the CPU to carry out the functions of the distribution server 10, as disclosed herein, and an operating system.

The store table 108 stores information related to each store. FIG. 3 is a diagram showing an example of a data structure of the store table 108. As shown in FIG. 3, the store table 108 stores store codes, company codes, store attributes, store server codes, and one or a plurality of issuance device codes, such that these codes are associated with each other. The store code is identification information capable of identifying the store. The company code is identification information capable of identifying a company that operates the stores. The store attribute is an attribute of the store. For example, the store attribute is a location or a business type and business category. The location is information indicating a place where the store is located. For example, the location is an address of the store. The business type and business category is information indicating a business type or a business category of the store. For example, the business type and business category is a supermarket, a convenience store, grocery retailer, or a restaurant business. The store table 108 is not limited to the store attribute such as the location or the business type and business category, and may store other attributes of the store. The store server code is identification information for identifying the store server 50 provided in the store. The issuance device code is identification information capable of identifying each of the issuance devices 60 provided in each store.

The issuance device table 109 stores information related to the issuance device 60. FIG. 4 is a diagram showing an example of a data structure of the issuance device table 109. As shown in FIG. 4, the issuance device table 109 stores issuance device codes, device types, manufacturer codes, device model codes, and versions such that these information items are associated with each other. The device type is a type of the issuance device 60. For example, the device type is a POS terminal, a kiosk terminal, a receipt printer, a self-service POS terminal, or a measurement device that is also capable of issuing a receipt. The issuance device code is identification information capable of identifying the issuance device 60. The manufacturer code is information indicating a company that manufactures the issuance device 60. The device model code is identification information capable of identifying a model of the issuance device 60. The version is information indicating a change stage of the issuance device 60. The print specification is a size or a resolution. The size is information indicating a size of a region of the receipt in which the additional information can be printed. That is, the size is information indicating sizes of the region in which the additional information can be printed in a longitudinal direction and a transverse direction. The resolution is the density of dots with which the additional information is printed. The issuance device table 109 is not limited to the print specification such as the size or the resolution, and may store another print specification. In the present embodiment, the issuance device table 109 stores the print specification. The print specification is not limited to be stored in the issuance device table 109, and may store the print specification in another data table.

The additional information table 110 stores and manages the additional information. FIG. 5 is a diagram showing an example of a data structure of the additional information table 110. As shown in FIG. 5, the additional information table 110 stores additional information codes, on-specification-basis codes, additional information items, and print specifications such that these information items are associated with each other. The additional information code is identification information for identifying the additional information. The additional information table 110 stores a plurality of additional information items, each having a different print specification for one additional information code. More specifically, the additional information table 110 may store a plurality of additional information items of which contents to be printed on receipts are the same but print specifications are different, or may store a plurality of additional information items of which the advertisement is for the same merchandise but words or images of the advertisement are different from each other. The on-specification-basis code is identification information for identifying each additional information item for each print specification. The additional information may be image data or character data, and the content of the additional information is not limited. For example, the content of the additional information may be an advertisement, may be a coupon, or may be a four-frame cartoon. The print specification is a print specification of the issuance device 60 that is to add the additional information and print the added additional information. More specifically, the print specification includes a size and/or a resolution. The size is information indicating a size of a region in which the additional information is to be printed on the receipt. That is, the size is information indicating the sizes of the additional information to be printed on the receipt in the longitudinal direction and the transverse direction. The resolution is the density of dots with which the additional information is to be printed. The additional information table 110 is not limited to the print specification such as the size or the resolution, and may store a different print specification of the additional information.

The addition schedule table 111 stores a schedule at which the additional information will be added to the receipt in each store. FIG. 6 is a diagram showing an example of a data structure of the addition schedule table 111. As shown in FIG. 6, the addition schedule table 111 stores addition schedule information items and refusal store codes, such that these information items are associated with each other. The addition schedule information is information indicating the date and time and condition for adding each additional information item to the receipt. The addition schedule information stores dates, time periods, device types, addition conditions, and additional information codes, such that these information items are associated with each other. The date is information indicating a date when the additional information is allowed to be added. The time period is information indicating a time period when the additional information is allowed to be added. The device type is a type of the issuance device 60. For example, the device type may be the POS terminal, the kiosk terminal, the receipt printer, the self-service POS terminal, or the measurement device that issues the receipt. The device type may be set such that a specific type of device is not designated. The addition condition is a condition for adding the additional information. Any condition may be set as the addition condition. For example, the addition condition may be an attribute of the customer such as a gender or an age. The addition condition may be merchandise purchased in one transaction, the number of pieces of merchandise purchased, or a total amount of money. When the merchandise is set as the addition condition, for example, the additional information is added under a condition in which specific merchandise is purchased. When the number of pieces of merchandise purchased or the total amount of money is set as the addition condition, for example, the additional information is added under a condition in which the number of pieces of merchandise purchased or the total amount of money is equal to or greater than a threshold. The addition condition may be a member of a specific organization. When the member is set as the addition condition, for example, the additional information is added under a condition in which a membership code of a membership card is presented. The addition condition is not limited to one type, and may be plural in number. The additional information code is information indicating additional information to be added to the receipt under a condition in which the addition condition is satisfied for the receipt issued in the time period of the date when the additional information is added. The refusal store code is a store code of the store that is not participating in the addition of the additional information and has refused the distribution of the additional information thereto. The addition schedule table 111 stores one or a plurality of store codes, as the refusal store code.

The communication interface 103 is an interface for communicating with a device connected to the distribution network 40.

The display unit 104 is, for example, a liquid crystal display device (LCD). The display unit 104 is not limited to the liquid crystal display, and maybe, for example, an organic EL display device.

The operation unit 105 is an input device such as a keyboard or a mouse. The operation unit 105 receives an operation for the distribution server 10.

Figure 7:
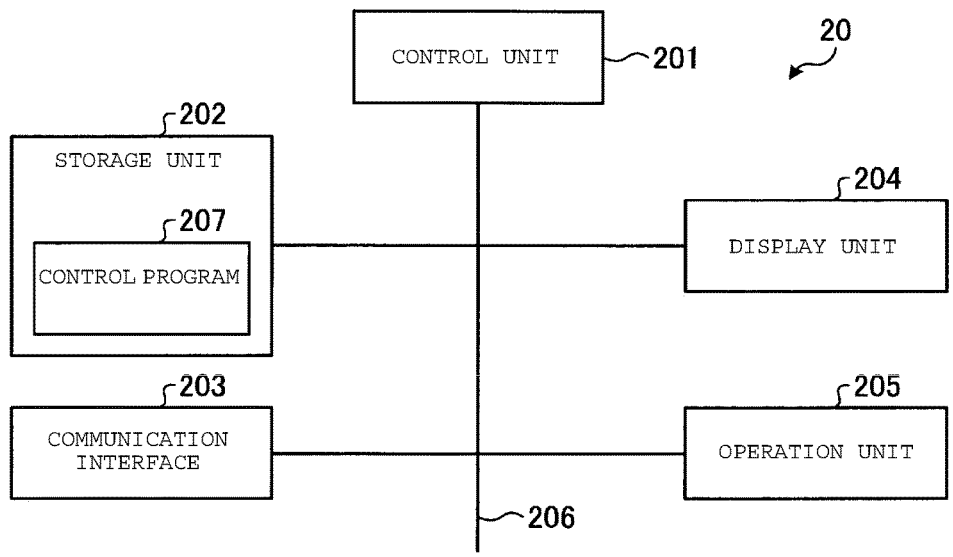
FIG. 7 is a block diagram showing an example of a hardware configuration of a user terminal.

FIG. 7 is a block diagram showing an example of a hardware configuration of the user terminal 20. The user terminal 20 includes a control unit 201, a storage unit 202, a communication interface 203, a display unit 204, and an operation unit 205. The control unit 201, the storage unit 202, the communication interface 203, the display unit 204, and the operation unit 205 are connected to each other through a system bus 206.

The control unit 201 controls the entire operation of the user terminal 20, and carries out various functions of the user terminal 20. The control unit 201 includes a CPU, a ROM, and a RAM. The CPU generally controls the operation of the user terminal 20. The ROM is a storage medium that stores various programs or data items. The RAM is a storage medium that temporarily stores various programs and various data items. The CPU executes a program stored in the ROM or the storage unit 202 while using the RAM as a work area.

The storage unit 202 is a storage device such as an HDD or an SSD. The storage unit 202 stores a control program 207. The control program 207 includes a program executed by the CPU to carry out the functions of the user terminal 20, as disclosed herein, and an operating system.

The communication interface 203 is an interface for communicating with a device connected to the distribution network 40.

The display unit 204 is, for example, a liquid crystal display device (LCD). The display unit 204 is not limited to the liquid crystal display, and may be, for example, an organic EL display device.

The operation unit 205 is an input device such as a keyboard or a mouse. The operation unit 205 receives an operation for the user terminal 20.

Figure 8:
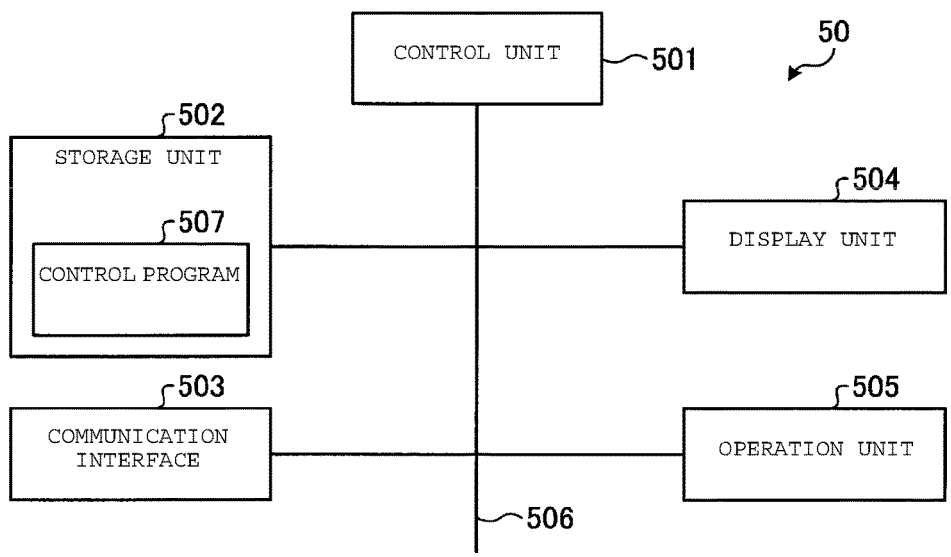
FIG. 8 is a block diagram showing an example of a hardware configuration of a store server.

FIG. 8 is a block diagram showing an example of a hardware configuration of the store server 50. The store server 50 includes a control unit 501, a storage unit 502, a communication interface 503, a display unit 504, and an operation unit 505. The control unit 501, the storage unit 502, the communication interface 503, the display unit 504, and the operation unit 505 are connected through a system bus 506.

The control unit 501 controls the entire operation of the store server 50, and carries out various functions of the store server 50. The control unit 501 includes a CPU, a ROM, and a RAM. The CPU generally controls the operation of the store server 50. The ROM is a storage medium that stores various programs or data items. The RAM is a storage medium that temporarily stores various programs and various data items. The CPU executes a program stored in the ROM or the storage unit 502 while using the RAM as a work area.

The storage unit 502 is a storage device such as an HDD or an SSD. The storage unit 502 stores a control program 507. The control program 507 includes a program executed by the CPU to carryout the functions of the store server 50, as disclosed herein, and an operating system.

The communication interface 503 is an interface for communicating with a device connected to the distribution network 40 or the store network 70.

The display unit 504 is, for example, a liquid crystal display device (LCD). The display unit 504 is not limited to the liquid crystal display, and maybe, for example, an organic EL display device.

The operation unit 505 is an input device such as a keyboard or a mouse. The operation unit 505 receives an operation for the store server 50.

Figure 9:
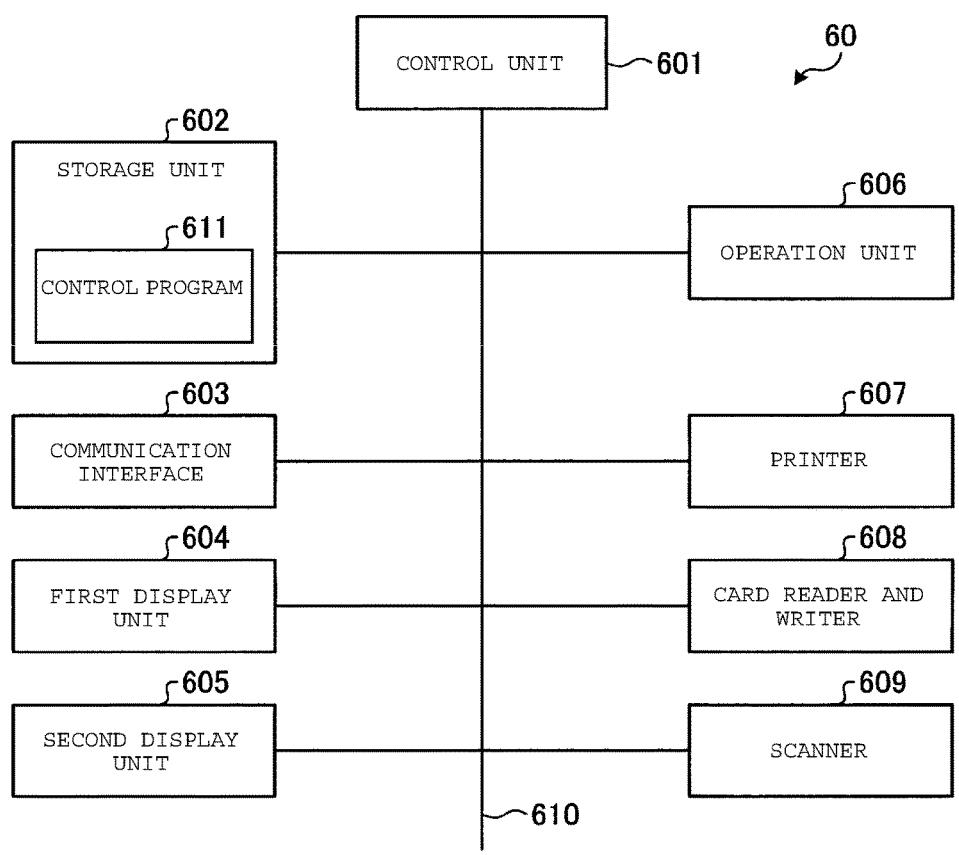
FIG. 9 is a block diagram showing an example of a hardware configuration of an issuance device.

FIG. 9 is a block diagram showing an example of a hardware configuration of the issuance device 60. In the present embodiment, an example in which the issuance device 60 is the POS terminal will be described. The issuance device 60 includes a control unit 601, a storage unit 602, a communication interface 603, a first display unit 604, a second display unit 605, an operation unit 606, a printer 607, a card reader and writer 608, and a scanner 609. The control unit 601, the storage unit 602, the communication interface 603, the first display unit 604, the second display unit 605, the operation unit 606, the printer 607, the card reader and writer 608, and the scanner 609 are connected to each other via a system bus 610.

The control unit 601 controls the entire operation of the issuance device 60, and carries out various functions of the issuance device 60. The control unit 601 includes a CPU, a ROM, and a RAM. The CPU generally controls the operation of the issuance device 60. The ROM is a storage medium that stores various programs or data items. The RAM is a storage medium that temporarily stores various programs and various data items. The CPU executes a program stored in the ROM or the storage unit 602 while using the RAM as a work area.

The storage unit 602 is a storage device such as an HDD or an SSD. The storage unit 602 stores a control program 611. The control program 611 includes a program executed by the CPU to carry out the functions of the issuance device 60, as disclosed herein, and an operating system.

The communication interface 603 is an interface for communicating with a device connected to the store network 70.

The first display unit 604 is a liquid crystal display device (LCD) in which touch panel is overlaid on a display surface. For example, the first display unit 604 displays various screens for a salesperson of the store. The second display unit 605 is a liquid crystal display device (LCD) in which a touch panel is overlaid on a display surface. For example, the second display unit 605 displays various screens for a salesperson of the store.

The operation unit 606 is an input device such as a keyboard. The operation unit 606 maybe a touch panel overlaid on the first display unit 604 or a touch panel overlaid on the second display unit 605.

The printer 607 issues a receipt acquired by printing a transaction content related to one transaction is printed on a predetermined sheet. The card reader and writer 608 scans a card in order to read card information from the card. The scanner 609 optically reads code information from a code symbol such as a barcode assigned to merchandise brought by the customer.

Hereinafter, functions of the respective devices of the distribution system 1 will be described. Here, FIG. 10 is a block diagram showing functional configurations of the respective devices of the distribution system 1.

Figure 10:
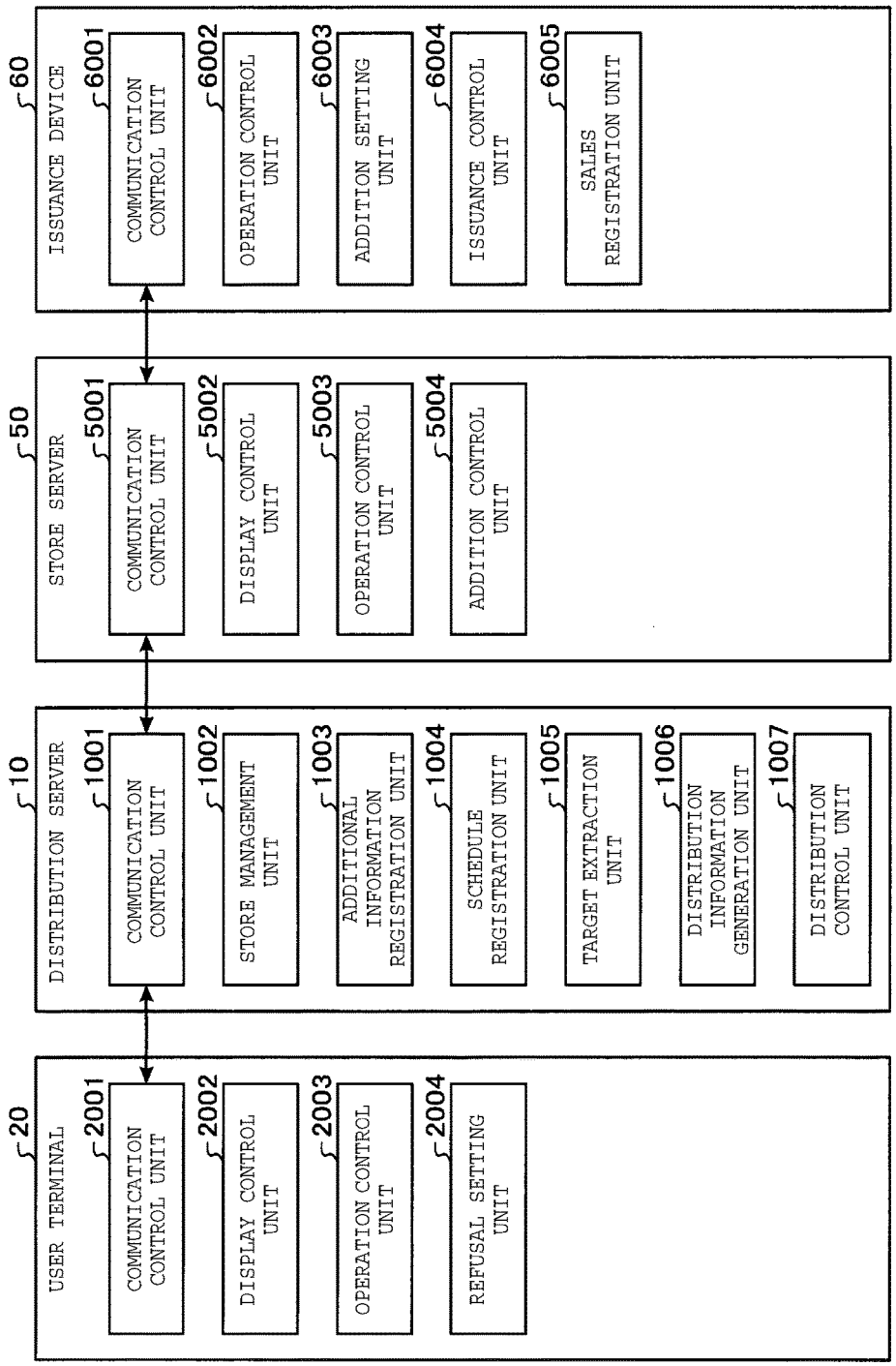
FIG. 10 is a block diagram showing a functional configuration of the devices of the distribution system.

The control unit 101 of the distribution server 10 loads the control program 107 stored in the storage unit 102 into the RAM, and is operated according to the control program 107 to implement the respective functional units shown in FIG. 10 in the RAM. Specifically, the control unit 101 of the distribution server 10 includes, as functional units, a communication control unit 1001, a store management unit 1002, an additional information registration unit 1003, a schedule registration unit 1004, a target extraction unit 1005, a distribution information generation unit 1006, and a distribution control unit 1007.

The communication control unit 1001 functions as a reception unit and a transmission unit according to the present embodiment. The communication control unit 1001 controls the communication interface 103 to communicate with a device such as the user terminal 20 or the store server 50 connected to the distribution network 40. The communication control unit 1001 also controls the communication interface 103 to communicate with a device such as the issuance device 60 connected to the store network 70 through the store server 50.

The store management unit 1002 functions as a management unit of the present embodiment. The store management unit 1002 manages information related to the store. That is, the store management unit 1002 manages the store table 108 and the issuance device table 109. For example, when a store is newly added, the store management unit 1002 adds the new store to the store table 108. When an issuance device 60 is newly added, the store management unit 1002 adds the new issuance device code of an issuance device 60 to be added to the store table 108.

The additional information registration unit 1003 registers additional information to be distributed in the additional information table 110. The additional information registration unit 1003 may register the additional information generated in the distribution server 10 in the additional information table 110. For example, the additional information registration unit 1003 may register the additional information received by the communication control unit 1001 from an external device in the additional information table 110. The additional information registration unit 1003 may also register the additional information input from an external device through a connection interface such as a universal serial bus (USB) interface in the additional information table 110.

The schedule registration unit 1004 sets a schedule at which the additional information is allowed to be added to the receipt or condition for adding the additional information to the receipt, in the addition schedule table 111. That is, the schedule registration unit 1004 sets for each date, the time period when the additional information is allowed to be added, the addition condition based on which the additional information is to be added, the device type of the issuance device 60 to which the additional information is added, and the additional information for each addition condition. The schedule registration unit 1004 may register the schedule in the addition schedule table 111 based on inputs received through the operation unit 105. The schedule registration unit 1004 may register the schedule or the condition in the addition schedule table 111 based on information received by the communication control unit 1001 from the external device. The schedule registration unit 1004 may register the schedule or the condition in the addition schedule table 111 based on information input from the external device through the connection interface such as the USB interface. The schedule registration unit 1004 may register the dates, the time periods, the device types, and the addition conditions, or some subset thereof.

In order to indicate the refusal of the addition of the additional information to the receipt, the schedule registration unit 1004 registers the store code of the store that refuses the distribution of the additional information. More specifically, the schedule registration unit 1004 causes the communication control unit 1001 to transmit the addition schedule information under a condition in which the communication control unit 1001 receives an addition schedule request for requesting the schedule of the additional information added to the receipt from the user terminal 20. The schedule registration unit 1004 causes the communication control unit 1001 to transmit the additional information having the additional information code designated in the addition schedule information. The communication control unit 1001 receives the store code of the store that refuses the addition of the additional information, and the refused additional information code under a condition in which specific additional information refused to be added, is selected through the user terminal 20. The schedule registration unit 1004 registers the store code received in association with the refused additional information code in addition schedule table 111, as the refusal store code.

The target extraction unit 1005 extracts the store server 50 of the store system 30 that satisfies the designated extraction condition from the store table 108, as the store server 50 that transmits the additional information. Any condition may be set as an extraction condition. For example, the extraction condition may be the company code, the store attribute, and a combination thereof. The target extraction unit 1005 may extract the store servers 50 of the plurality of stores corresponding to different company codes under a condition in which the extraction condition is appropriate. The target extraction unit 1005 may extract the store server 50 of the store of which the location is included in a designated region irrespective of the company code under a condition in which a specific location is designated as the extraction condition. The target extraction unit 1005 extracts the store server 50 of the store for which the business type and business category is the restaurant irrespective of the company code under a condition in which the restaurant is designated as the extraction condition.

Figures 11, 12:
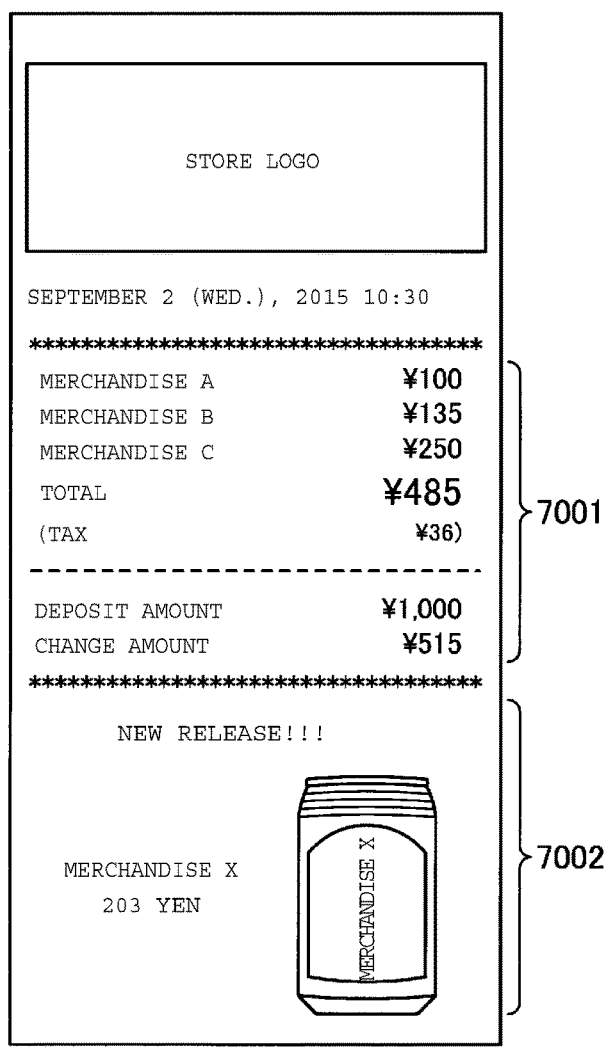
FIG. 11 is a diagram showing an example of a data structure of distribution information.
FIG. 12 is a diagram showing an example receipt to which the additional information is added.

The distribution information generation unit 1006 generates distribution information to be distributed to each store server 50 extracted by the target extraction unit 1005 in cooperation with the distribution control unit 1007. The distribution information includes the issuance device code, the time period when the additional information is allowed to be added to the receipt, and the addition condition set in the addition schedule table 111, e.g., gender, age. FIG. 11 is a diagram showing an example of a data structure of the distribution information. The distribution information is stored such that the issuance device code, the time period, the addition condition, and the additional information are associated with each other. The issuance device code is information indicating the issuance device 60 that is to add the additional information to the receipt. The time period is information indicating the time period when the additional information is allowed to be added to the receipt. The addition condition is information indicating the condition based on which the additional information is to be added to the receipt.

The issuance device 60 adds the additional information to the receipt in accordance with the time period, and the addition condition set forth in the distribution information. It should be noted that the issuance devices 60 of different device types add different additional information items to the receipts according to their device types. For example, the issuance devices 60 having different device types add different additional information items to the receipts according to their print specification, such as the size of the printable receipt or the printing resolution.

The distribution information generation unit 1006 generates the distribution information according to the device type for each issuance device 60 of each store system 30 extracted by the target extraction unit 1005. More specifically, the distribution information generation unit 1006 extracts the issuance device code associated with the store server code of the store system 30 as a distribution destination in the store table 108. The distribution information generation unit 1006 extracts the device type of the extracted issuance device code by comparing the extracted issuance device code with the issuance device code of the issuance device table 109. The distribution information generation unit 1006 extracts the print specification of the issuance device code of the issuance device 60 from the issuance device table 109, as the extracted distribution destination. The distribution information generation unit 1006 selects the additional information item appropriate for the extracted device type and print specification from the additional information table 110.

The distribution information generation unit 1006 may generate the distribution information by various methods. For example, the distribution information generation unit 1006 may set the additional information to be appropriate for the print specification of the issuance device 60 by converting the additional information having the additional information code set in the addition schedule table 111 into the additional information appropriate for the print specification of the issuance device 60. More specifically, the distribution information generation unit 1006 extracts the additional information code set in the addition schedule table 111. The distribution information generation unit 1006 extracts the print specification of the issuance device 60 as the distribution destination from the issuance device table 109.

The distribution information generation unit 1006 converts the additional information having the extracted additional information code into the additional information appropriate for the print specification of the issuance device 60. For example, the conversion of the additional information means that the size of the print specification of the additional information is increased or decreased. Accordingly, the distribution information generation unit 1006 generates the distribution information appropriate for the device type and the print specification. The process of converting the additional information into the additional information appropriate for the extracted print specification is not limited to being performed in the distribution server 10, and maybe performed by the store server 50 or the issuance device 60.

Here, there is additional information which is not preferable to be added to the receipts in some stores. Each store registers the store code in association with the additional information which is not desired to be added, as the refusal store code. Accordingly, the distribution information generation unit 1006 excludes such additional information from the distribution information. That is, the distribution information generation unit 1006 generates the distribution information including the additional information items and excluding the refused additional information items under a condition in which there are additional information items that have been refused and additional information items that have not been refused in the addition schedule table 111.

The distribution control unit 1007 functions as a distribution unit of the present embodiment in cooperation with the communication control unit 1001. The distribution control unit 1007 controls the communication control unit 1001 to transmit the distribution information generated by the distribution information generation unit 1006 to the store server 50 extracted by the target extraction unit 1005. Each store server 50 that receives the distribution information distributes the additional information to the issuance device having the issuance device code designated in the distribution information.

Specifically, the distribution control unit 1007 causes the target extraction unit 1005 to extract the store server 50 under a condition in which a predetermined distribution condition is satisfied. When the condition is satisfied, the distribution control unit 1007 causes the distribution information generation unit 1006 to generate the distribution information. The distribution control unit 1007 causes the communication control unit 1001 to transmit the generated distribution information to the extracted store server 50. Here, the additional information code associated with a refusal store code is excluded from the distribution information distributed to the store having the refusal store code. That is, the distribution control unit 1007 controls the distribution of the additional information to the store server 50 of the store that refuses the distribution so that the refused additional information is excluded. The distribution control unit 1007 distributes the distribution information including the remaining additional information items in situations where there are additional information items that have been refused and additional information items that have not been refused. Any condition maybe set as the distribution condition. For example, the distribution condition may be a predetermined time, or may receive an operation for instructing the distribution of the distribution information. The distribution destination of the distribution information is not limited to the store server 50, and may be the issuance device 60.

The control unit 201 of the user terminal 20 loads the control program 207 stored in the storage unit 202 into the RAM, and is operated according to the control program 207, to implement the respective functional units shown in FIG. 10 in the RAM. Specifically, the control unit 201 of the user terminal 20 includes, as functional units, a communication control unit 2001, a display control unit 2002, an operation control unit 2003, and a refusal setting unit 2004.

The communication control unit 2001 controls the communication interface 203 to communicate with a device such as the distribution server 10 or the store server 50 connected to the distribution network 40. The communication control unit 2001 controls the communication interface 203 to communicate with a device such as the issuance device 60 connected to the store network 70 through the store server 50.

The display control unit 2002 controls the display unit 204 to display various information items. The operation control unit 2003 controls the operation unit 205 to receive inputs relating to various operations.

The refusal setting unit 2004, in response to user inputs, sets a refusal to add to the receipt, the additional information of the additional information code selected from the addition schedule information received by the communication control unit 2001 from the distribution server 10. That is, the refusal setting unit 2004 sets a refusal to distribute the additional information to be added to the receipt. More specifically, the refusal setting unit 2004 transmits the addition schedule request for requesting the transmission of the addition schedule information to the distribution server 10, as part of the preparation of the refusal of the distribution. The refusal setting unit 2004 displays the addition schedule information and the additional information on the display control unit 2002 under a condition in which the communication control unit 2001 receives the addition schedule information and the additional information having the additional information code designated in the addition schedule information. The refusal setting unit 2004 selects the additional information code of the additional information refused to be distributed, based on an instruction of the user such as the manager of the store, from the addition schedule information. The refusal setting unit 2004 causes the communication control unit 2001 to transmit the store code of the store that refuses the distribution of the additional information having the selected additional information code to the distribution server 10. The distribution server 10 registers the received store code in the addition schedule table 111, as the refusal store code associated with the selected additional information code.

The control unit 501 of the store server 50 loads the control program 507 stored in the storage unit 502 into the RAM, and is operated according to the control program 507, to implement the respective functional units shown in FIG. 10 in the RAM. Specifically, the control unit 501 of the store server 50 includes, as functional units, a communication control unit 5001, a display control unit 5002, an operation control unit 5003, and an addition control unit 5004.

The communication control unit 5001 controls the communication interface 503 to communicate with a device such as the distribution server 10 or the user terminal 20 connected to the distribution network 40. The communication control unit 5001 controls the communication interface 503 to communicate with a device such as the issuance device 60 connected to the store network 70.

The display control unit 5002 controls the display unit 504 to display various information items. The operation control unit 5003 controls the operation unit 505 to receive inputs relating to various operations.

The addition control unit 5004 requests the issuance device 60 having the issuance device code of the distribution information to add the additional information designated in the distribution information under a condition in which the communication control unit 5001 receives the distribution information. That is, if the condition is satisfied, the addition control unit 5004 causes the communication control unit 5001 to transmit the setting request including the distribution information to the issuance device 60. Here, the setting request is a request to the issuance device 60 to add the additional information included in the distribution information to the receipt when the receipt is issued.

The addition control unit 5004 cancels the setting for adding the additional information to the issuance device 60. For example, the addition control unit 5004 causes the communication control unit 5001 to transmit a cancellation request for canceling the setting for adding the additional information to the receipt, to the issuance device 60 under a condition in which the operation control unit 5003 receives a cancellation operation of canceling the setting for adding the additional information.

The control unit 601 of the issuance device 60 loads the control program 611 stored in the storage unit 602 into the RAM, and is operated according to the control program 611, to implement the respective functional units shown in FIG. 10 in the RAM. Specifically, the control unit 601 of the issuance device 60 includes, as functional units, a communication control unit 6001, an operation control unit 6002, an addition setting unit 6003, an issuance control unit 6004, and a sales registration unit 6005. In the present embodiment, an example in which the issuance device 60 is the POS terminal will be described.

The communication control unit 6001 functions as a reception unit of the present embodiment. The communication control unit 6001 controls the communication interface 603 to communicate with a device such as the store server 50 connected to the store network 70. The communication control unit 6001 controls the communication interface 603 to communicate with a device such as distribution server 10 or the user terminal 20 connected to the distribution network 40 through the store server 50.

The operation control unit 6002 controls the operation unit 606 to receive inputs relating to various operations.

The addition setting unit 6003 stores the distribution information included in a received setting request in the storage unit 602 under a condition in which the setting request of the distribution information is received by the communication control unit 6001. The addition setting unit 6003 sets the additional information included in the distribution information to be added to the receipt.

The addition setting unit 6003 cancels the setting for adding the additional information to the receipt under a condition in which the communication control unit 6001 receives the cancellation request for canceling the setting for adding the additional information.

The issuance control unit 6004 functions a print control unit of the present embodiment. The issuance control unit 6004 controls the issuance of the receipt. More specifically, the issuance control unit 6004 extracts the time period appropriate for the time when the receipt is issued from the distribution information under a condition in which the receipt is issued. The issuance control unit 6004 extracts the additional information associated with the addition condition received by the operation control unit 6002 from the extracted time period. The issuance control unit 6004 issues the receipt to which the extracted additional information is added. For example, the issuance control unit 6004 controls the printer 607 to print the receipt to which the extracted additional information is added.

The issuance control unit 6004 controls the addition of the additional information and the issues the receipt to which the additional information is not added under a condition in which the addition setting unit 6003 cancels the setting for adding the additional information to the receipt.

Here, FIG. 12 is a diagram showing an example of the receipt to which the additional information is added. The receipt includes a transaction content print region 7001, and an additional information print region 7002. The transaction content print region 7001 is a region of the receipt where the transaction content is printed. The additional information print region 7002 is a region where the additional information is printed. An advertisement of merchandise X is printed and added in the additional information print region 7002 shown in FIG. 12, as the additional information. The additional information print region 7002 shown in FIG. 12 is positioned under the transaction content print region 7001, and the additional information print region 7002 maybe positioned in any area of the receipt. The transaction content print region 7001 and the additional information print region 7002 may be separated from each other.

The sales registration unit 6005 controls a sales data process. That is, the sales registration unit 6005 registers the merchandise having the merchandise code received by the scanner 609, as merchandise as a sales target. The sales registration unit 6005 calculates a total amount of money of the merchandise registered as the sales target.

Figure 13:
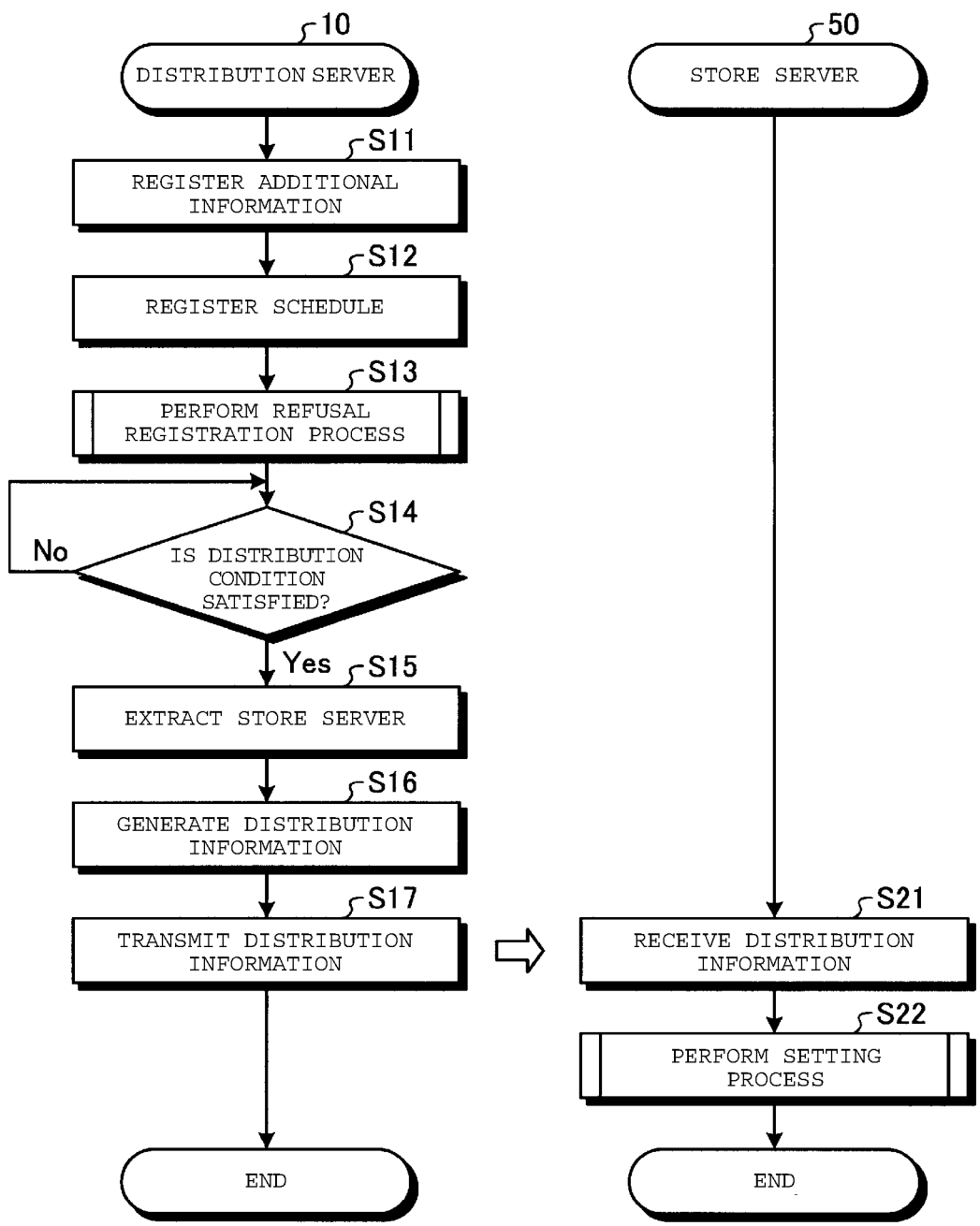
FIG. 13 is a flowchart showing an example sequence of operations of a distribution process.

Hereinafter, operations of the respective devices of the distribution system 1 will be described. Here, FIG. 13 is a flowchart showing an example of a distribution process performed by the distribution server 10 and the store server 50 of the distribution system 1 according to the embodiment.

The additional information registration unit 1003 of the distribution server 10 registers the additional information in the additional information table 110 (step S11). The schedule registration unit 1004 of the distribution server 10 registers the addition condition in the addition schedule table 111 (step S12).

The distribution server 10 performs a refusal registration process to be described below in cooperation with another device (step S13).

The distribution control unit 1007 of the distribution server 10 determines whether or not the distribution condition in which the distribution information is distributed is satisfied (step S14). When the distribution condition is not satisfied (step S14; No), the distribution server 10 waits until the distribution condition is satisfied.

Meanwhile, when the distribution condition is satisfied (step S14; Yes), the target extraction unit 1005 of the distribution server 10 extracts the store server 50 to which the distribution information is to be distributed from the store table 108 (step S15).

The distribution information generation unit 1006 of the distribution server 10 generates the distribution information to be distributed to the extracted store server 50 (step S16). In this case, the distribution information generation unit 1006 generates the distribution information excluding the refused additional information for the store server 50 of the store having the store code registered as the refusal store code.

The communication control unit 1001 of the distribution server 10 transmits the generated distribution information to the store server 50 (step S17). In this case, the communication control unit 1001 transmits the distribution information excluding the refused additional information to the store server 50 of the store having the store code registered as the refusal store code.

The communication control unit 5001 of the store server 50 receives the distribution information (step S21).

The store server 50 performs a setting process to be described below in cooperation with another device (step S22).

As above, the respective devices of the distribution system 1 end the distribution process.

Hereinafter, a refusal registration process performed by the respective devices of the distribution system 1 will be described. Here, FIG. 14 is a flowchart showing an example of the refusal registration process performed by the distribution server 10 and the user terminal 20 of the distribution system 1 according the embodiment.

The communication control unit 2001 of the user terminal 20 transmits the addition schedule request for requesting the transmission of the addition schedule information to the distribution server 10 (step S31).

The communication control unit 1001 of the distribution server 10 receives the addition schedule request (step S41). The communication control unit 1001 of the distribution server transmits the addition schedule information and the additional information having the additional information code designated in the addition schedule information to the user terminal 20 (step S42).

The communication control unit 2001 of the user terminal receives the addition schedule information and the additional information having the additional information code designated in the addition schedule information (step S32). The display control unit 2002 of the user terminal 20 displays the addition schedule information and the additional information having the additional information code designated in the addition schedule information on the display unit 204 (step S33).

The refusal setting unit 2004 of the user terminal 20 determines whether or not the user has selected refusal of the additional information (step S34). Under a condition in which the user has not selected the refusal (step S34; No), the user terminal 20 ends the refusal registration process.

Meanwhile, under a condition in which the user has selected the refusal (step S34; Yes), the communication control unit 2001 of the user terminal 20 transmits the selected additional information code and the store code of the store for which the distribution of the additional information has been refused, to the distribution server 10 (step S35).

The communication control unit 1001 of the distribution server 10 receives the selected additional information code and the store code of the store for which the distribution of the additional information has been refused (step S43). The schedule registration unit 1004 of the distribution server 10 associates the received store code with the received additional information code, and registers the received store code as the refusal store code in the addition schedule table 111 (step S44).

As above, the respective devices of the distribution system 1 end the refusal registration process.

Hereinafter, the setting process performed by the respective devices of the distribution system 1 will be described. Here, FIG. 15 is a flowchart showing an example of the setting process performed by the store server 50 and the issuance device 60 of the distribution system 1 according to the embodiment.

The communication control unit 5001 of the store server 50 transmits the distribution information received from the distribution server 10 to each issuance device 60 (step S51).

The communication control unit 6001 of the issuance device 60 receives the distribution information (step S61). The addition setting unit 6003 of the issuance device 60 sets the additional information included in the received distribution information to be added to the receipt (step S62).

As above, the respective devices of the distribution system 1 end the setting process.

Hereinafter, a cancellation process performed by the respective devices of the distribution system 1 will be described. Here, FIG. 16 is a flowchart showing an example of the cancellation process performed by the store server 50 and the issuance device 60 of the distribution system 1 according to the embodiment.

The display control unit 5002 of the store server 50 displays the additional information having the additional information code included in the addition schedule information on the display unit 504 (step S71). Accordingly, the display control unit 5002 allows the manager of the store to identify whether or not the displayed additional information is the additional information to be refused.

The addition control unit 5004 of the store server 50 determines whether or not cancellation setting for canceling the addition of the additional information has been input (step S72). Under a condition in which the cancellation setting has not been input (step S72; No), the store server 50 ends the cancellation process.

Meanwhile, under a condition in which the cancellation setting has been input (step S72; Yes), the communication control unit 5001 of the store server 50 transmits the cancellation request for requesting to cancel the setting for adding the additional information, to the issuance device 60 (step S73).

The communication control unit 6001 of the issuance device 60 receives the cancellation request (step S81). The addition setting unit 6003 of the issuance device 60 cancels the setting for adding the additional information (step S82).

As above, the respective devices of the distribution system 1 end the cancellation process.

Figure 17:
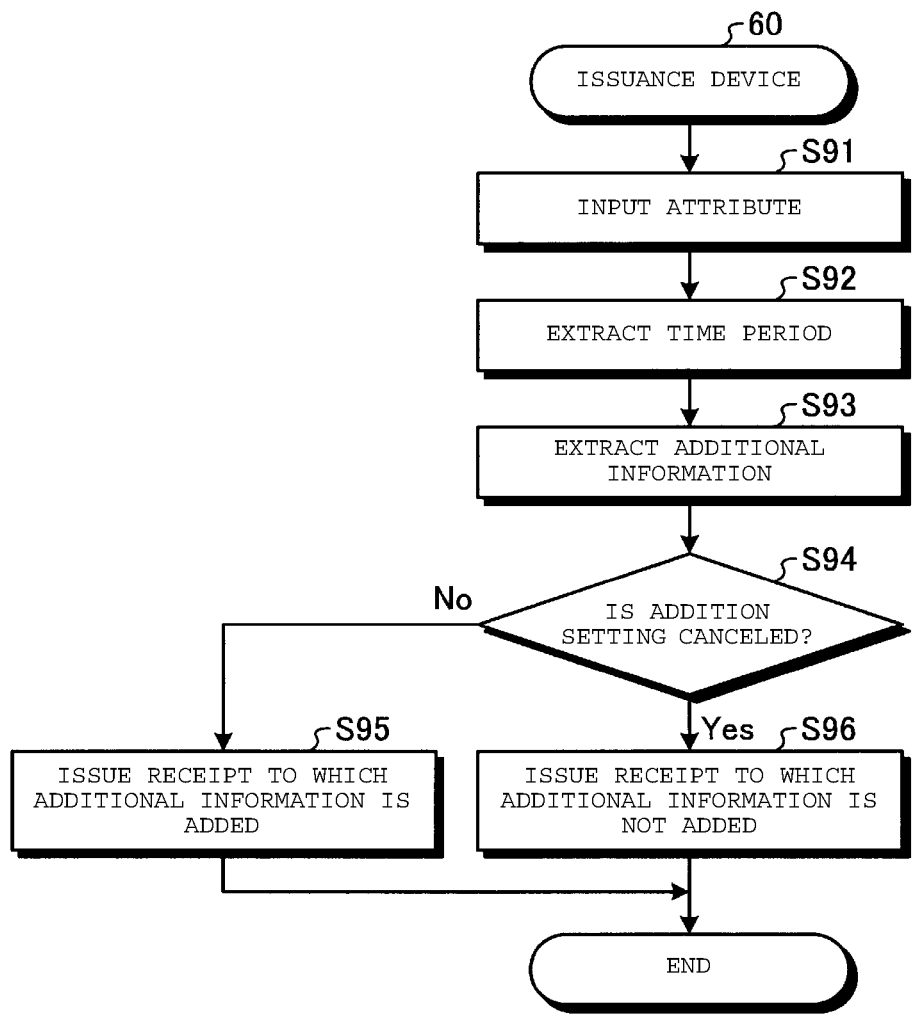
FIG. 17 is a flowchart showing an example sequence of operations of an issuance process.

Hereinafter, an issuance process performed by the issuance device 60 will be described. Here, FIG. 17 is a flowchart showing an example of the issuance process performed by the issuance device 60 according to the embodiment.

The operation control unit 6002 of the issuance device 60 receives an input of the addition condition (step S91). That is, the operation control unit 6002 receives, for example, an input of the attribute of the customer.

The issuance control unit 6004 of the issuance device 60 extracts the time period appropriate for the time when the receipt is allowed to be issued, from the distribution information (step S92).

The issuance control unit 6004 of the issuance device 60 extracts the additional information associated with the addition condition appropriate for the attribute of the customer from the time period extracted in step S92 (step S93).

The issuance control unit 6004 of the issuance device 60 determines whether or not the addition of the extracted additional information is canceled (step S94). Under a condition in which the addition of the additional information is not canceled (step S94; No), the issuance control unit 6004 of the issuance device 60 issues the receipt to which the additional information is added (step S95).

Meanwhile, under a condition in which the addition of the additional information is canceled (step S94; Yes), the issuance control unit 6004 of the issuance device 60 issues the receipt to which the additional information is not added (step S96).

As above, the respective devices of the distribution system 1 end the issuance process.

As described above, in accordance with the distribution system 1 according to the present embodiment, the distribution server 10 manages the store table 108, the issuance device table 109, the additional information table 110, and the addition schedule table 111. The distribution server 10 distributes the additional information added to the receipt to the stores having the company codes of the store table 108. Here, the distribution server 10 controls the distribution of the refused additional information under a condition in which the distribution of the additional information is refused. Thus, the issuance device 60 does not add the additional information to the printed matter such as the receipt. Accordingly, the distribution server 10 can limit the information to be added to the printed matter on a per store basis.

The program to be executed by each device according to the embodiment or a modification example is previously embedded into a storage medium (ROM or storage unit) of each device and is provided, but the program is not limited thereto. For example, the program may be in recorded as a file having an installable or executable format in a computer readable recording medium such as a CD-ROM, a flexible disk (FD), a CD-R, or a digital versatile disk (DVD), and may be provided. The storage medium is not limited to a medium independent from a computer or an embedded system, and may include a storage medium that stores or temporarily stores a program which is delivered and downloaded by a LAN or the Internet.

The program to be executed by each device according to the embodiment or the modification example may be stored in a computer connected to a network such as the Internet, and may be provided by being downloaded via the network. Alternatively, the program may be provided or distributed via the network such as the Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A content distribution server at a root node of a networked computer system having store servers that are intermediate nodes of the networked computer system, the store servers including a first store server communicating with the content distribution server over a first network and a second store server communicating with the content distribution server over the first network, a plurality of first receipt issuing devices that are leaf nodes of the networked computer system, the first receipt issuing devices communicating with the first store server over a first local network, and a plurality of second receipt issuing devices that are also leaf nodes of the networked computer system, the second receipt issuing devices communicating with the second store server over a second local network, the content distribution server comprising:
   a control unit including a processor; and
   a storage unit in which control programs executed in the processor are stored, the control programs including executable code for
      a management unit that manages data structures that associate store codes capable of identifying stores corresponding to the store servers, device codes capable of identifying the first and second receipt issuing devices, and print specifications of the first and second receipt issuing devices;
      a distribution unit that generates content that is to be added to receipts issued by the first and second receipt issuing devices; and
      a reception unit that processes control inputs relating to whether or not the content is to be distributed to the first store server and whether or not the content is to be distributed to the second store server,
   wherein the first receipt issuing devices includes a first device with a first print specification and a second device with a second print specification, and the second receipt issuing devices includes a third device with the first print specification and a fourth device with the second print specification, and
   wherein the distribution unit selects as a distribution target for a first content, the first and third devices and not the second and fourth devices, and to select as a distribution target for a second content, the second and fourth devices and not the first and third devices.

2. The content distribution server of claim 1, wherein the first content and the second content communicate identical advertising messages but differ in at least one of printing size and printing resolution.

3. The content distribution server of claim 2, wherein the printing size and the printing resolution of the first content match those defined in the first print specification, and the printing size and the printing resolution of the second content match those defined in the second print specification.

4. A non-transitory computer readable medium containing instructions executable by a content distribution server at a root node of a networked computer system having store servers that are intermediate nodes of the networked computer system, the store servers including a first store server communicating with the content distribution server over a first network and a second store server communicating with the content distribution server over the first network, a plurality of first receipt issuing devices that are leaf nodes of the networked computer system, the first receipt issuing devices communicating with the first store server over a first local network, and a plurality of second receipt issuing devices that are also leaf nodes of the networked computer system, the second receipt issuing devices communicating with the second store server over a second local network, wherein the instructions cause the content distribution server to implement functional units including:

- a management unit that manages data structures that associate store codes capable of identifying stores corresponding to the store servers, device codes capable of identifying the first and second receipt issuing devices, and print specifications of the first and second receipt issuing devices;
- a distribution unit that generates content that is to be added to receipts issued by the first and second receipt issuing devices; and
- a reception unit that processes control inputs relating to whether or not the content is to be distributed to the first store server and whether or not the content is to be distributed to the second store server,
- wherein the first receipt issuing devices includes a first device with a first print specification and a second device with a second print specification, and the second receipt issuing devices includes a third device with the first print specification and a fourth device with the second print specification, and
- wherein the distribution unit selects as a distribution target for a first content, the first and third devices and not the second and fourth devices, and to select as a distribution target for a second content, the second and fourth devices and not the first and third devices.

5. The non-transitory computer readable medium of claim 4, wherein the first content and the second content communicate identical advertising messages but differ in at least one of printing size and printing resolution.

6. The non-transitory computer readable medium of claim 5, wherein the printing size and the printing resolution of the first content match those defined in the first print specification, and the printing size and the printing resolution of the second content match those defined in the second print specification.

* * * * *